US006228518B1

(12) United States Patent
Kindler

(10) Patent No.: US 6,228,518 B1
(45) Date of Patent: May 8, 2001

(54) LOW COST, LIGHTWEIGHT FUEL CELL ELEMENTS

(75) Inventor: Andrew Kindler, San Marino, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/198,066

(22) Filed: Nov. 23, 1998

Related U.S. Application Data

(60) Provisional application No. 60/066,537, filed on Nov. 26, 1997.

(51) Int. Cl.⁷ .................................................. H01M 8/04
(52) U.S. Cl. .................... 429/13; 429/32; 429/34
(58) Field of Search ............................... 429/13, 26, 32, 429/34, 210

(56) References Cited

U.S. PATENT DOCUMENTS

| | | |
|---|---|---|
| 3,717,506 | 2/1973 | Hopkins . |
| 4,658,499 | 4/1987 | Rowlette ............................... 429/210 |
| 5,063,122 | 11/1991 | Rohr ........................................ 429/32 |
| 5,296,320 | * 3/1994 | Ginatta et al. ........................ 429/210 |
| 5,599,638 | * 2/1997 | Surampudi et al. ................... 429/33 |
| 5,624,769 | 4/1997 | Li et al. ................................. 429/32 |
| 5,773,162 | * 6/1998 | Surampudi et al. ................... 429/39 |
| 5,789,093 | * 8/1998 | Malhi ..................................... 429/34 |

* cited by examiner

Primary Examiner—Stephen Kalafut
(74) Attorney, Agent, or Firm—Fish & Richardson P.C.

(57) ABSTRACT

New fuel cell elements for use in liquid feed fuel cells are provided. The elements including biplates and endplates are low in cost, light in weight, and allow high efficiency operation. Electrically conductive elements are also a part of the fuel cell elements.

20 Claims, 3 Drawing Sheets

LOW COST, LIGHTWEIGHT FUEL CELL ELEMENTS

CROSS REFERENCE TO RELATED APPLICATIONS

This application claims the benefit of provisional U.S. Patent application, Serial No. 60/066,537, filed Nov. 26, 1997.

STATEMENT AS TO FEDERALLY SPONSORED RESEARCH

The invention described herein was made in the performance of work under a NASA contract, and is subject to the provisions of Public Law 96-517 (35 U.S.C. 202) in which the Contractor has elected to retain title.

FIELD OF THE INVENTION

The invention relates to the methods and apparatus of generating energy through low-cost, efficient processes. More specifically, the invention relates to components of a fuel cell for generating electricity.

BACKGROUND

Methanol fuel cells promise to provide efficient and low-cost electrical current from methanol without burning the fuel. Therefore, pollution from combustion is not created by the use of such fuel cells. The fuel cells are more than twice as efficient as gasoline engines; they run cool, without the need for insulation and structural reinforcement; and rely on a relatively inexpensive fuel. The methanol fuel cells which were designed initially produced about 5 kW, running up to 200 continuous hours, and up to 3,000 intermittent hours, without suffering any loss in performance. The goal is to produce units which can generate up to 40 kW, which would be enough to power a full-size automobile, and which can run for at least 1,000 continuous hours.

The biplate is a two-sided component which is placed between the membrane electrode assemblies (MEA) in a fuel cell stack. One side of the biplate is oriented to face the anode of one MEA, and the other side of the biplate is oriented to face the cathode of another MEA. The biplate provides electrical contact to both of the MEA. It also acts to separate air or oxygen provided to the cathode of one MEA and the fuel provided to the anode of the other MEA. As such it forms part of the fuel cell compartment containing either fuel or air.

The endplate is a fuel cell component which forms part of the last fuel cell compartment in a stack, if a stack is present. If the cells are not stacked, the endplate is simply a wall of the fuel cell. The endplate provides electrical contact between an electrode of the fuel cell and the electrical load which spans the fuel cell or stack of fuel cells. The endplate is simply a single-ended biplate. Thus, both fuel cell components, biplates and endplates, are electrically conductive elements. These plates were typically formed of machined graphite.

Fuel cell components designed for use in hydrogen/air fuel cells needed to be both thermally conductive and electrically conductive. Hydrogen/air stacks could only release the heat generated internally through the stack material. Prior systems often used cooling plates inserted between biplates for the specific purpose of withdrawing heat from the stack in such fuel cells.

At this time, cost is the major factor limiting methanol fuel cell commercialization. An important component of the total cost of methanol fuel cells is the machined graphite biplates and endplates used in conventional cells. This material is relatively expensive, representing up to one third of the cost of a fuel cell. It is also relatively heavy. The weight of these components in fuel cells makes up a significant fraction of the total weight of the fuel cell.

SUMMARY OF THE INVENTION

The invention results from the use of a newly designed fuel cell component assembly in liquid feed fuel cells. The components are made of a material which is more easily manufactured and less dense than that of the electrically conductive elements which carry electrical current.

The resulting fuel cells are less costly to manufacture, made of less costly materials, and lighter than conventional cells. The new components demonstrate that the improvements which are possible are extremely practical in nature, and can be used in fuel cells for automobiles, lawn mowers, portable electrical devices, stand-alone power generators, and in replacement of the internal combustion engine generally. The invention also finds use in fuel cells used in the space shuttle and other high-end applications.

As used herein, a "biplate" is a two-sided separator which prevents fluid communication between compartments of fuel cells which cannot be in fluid communication for the cell to function properly. For example, a biplate can prevent fluid communication between the adjacent negative and positive electrodes of a fuel cell. A biplate may also prevent fluid communication between the last compartment of a fuel cell in a stack and the exterior of the fuel cell. This last aspect of the definition of biplate includes the specific fuel cell components which are found at each end of a stack of cells, also referred to as the endplates. "Endplates" are merely biplates which are not between fuel cell compartments, but are found at the terminus of a fuel cell stack.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In case of conflict, the present specification, including definitions, will control. In addition, the materials, methods and examples are illustrative only and not intended to be limiting.

Other features and advantages of the invention will be apparent from the following detailed description, and from the claims.

DESCRIPTION OF THE PREFERRED EMBODIMENTS

Figure 1:
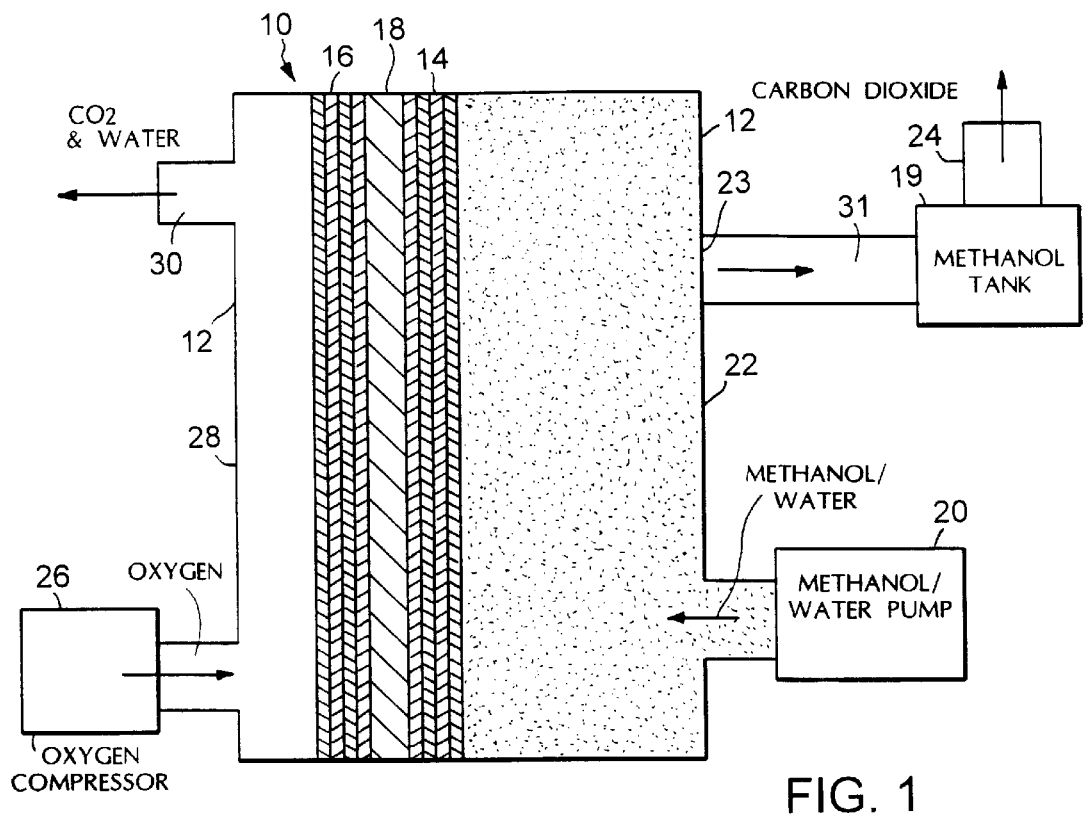
FIG. 1 is a schematic diagram of a particular embodiment of a liquid feed fuel cell.

Devices which are able to convert chemical energy into electrical energy are commonly referred to as batteries. Fuel cells are a special class of batteries in which high energy chemical reactants are continuously fed into the battery and the lower energy chemical products are continuously removed. Batteries can comprise one or several individual cells. A single cell includes a negative electrode and a positive electrode. An electrolytic solution separates the electrodes. When the cell is discharging (converting chemical to electrical energy), an oxidation reaction occurs at the negative electrode (anode). At the positive electrode (cathode), a reduction reaction occurs during discharging.

For the electrode reactions of any corresponding pair of anode and cathode (an electrochemical couple), electrons pass through the external circuit from the anode to the cathode. Completion of the circuit occurs when ionic species are transferred across the cell through the intervening electrolyte. The change from electronic conduction to ionic conduction occurs at the electrodes and involves an electrochemical (Faradaic) reaction. However, electrons cannot pass through the electrolyte, or short circuiting will result in cell self-discharge.

The reactions described above have a sequence of more elementary and microscopically scaled steps. In any case, the reactants must approach each other within molecular distances, and the products must be continuously removed for the cell to operate properly. Electrons from the external circuit must reach or leave the reaction sites. Therefore, the reaction sites must be electrically connected to the external circuit. Typically, ionic species must migrate toward or away from the reaction site. Concentration variations can therefore affect reaction rates. There may also be ion transport through solid phases. Energy losses associated with concentration variations produce lowered cell potential. These losses are termed the concentration overpotential. There is also heat associated with the energy required to transport ions through the electrolyte, to carry the electric current. This heat is called the resistance loss or Ohmic overpotential. Energy is also necessary to drive the chemical reactions which are to take place, resulting in a production of heat, rather than electrical energy. Energy losses caused by driving the transfer of charge at the electrodes results in a reduction in the cell potential (surface overpotential). Heat is produced irreversibly by each loss process described above, and is defined by each overpotential multiplied by the electrical current. This heat is always positive, resulting in a hotter cell. Reversible heat is also associated with cell operation, which can either add or remove heat. Besides voltage losses, losses in overall energy occur when side reactions (corrosion reactions) occur.

The driving force which pushes electrons through the electrical circuit is the change in the free energy:

$$G = H - TS$$

where H is the enthalpy (heat content), S is the entropy, and T is the temperature. The cell potential U is related to the free energy change as follows:

$$\Delta G = -n F U$$

where $\Delta G$ is the free energy change for the overall cell reaction based on the reversible transfer of n equivalents of electrons, and F is the Faraday constant. This relation holds in the absence of corrosion reactions.

Conventional hydrogen/air fuel cells were required to have components which were able to dissipate heat generated internally. Biplates and endplates were required to be made of a thermally conductive materials. Such materials are typically dense and difficult to manufacture.

It has been noted by the present inventor that liquid feed fuel cells use liquids which are able to carry heat away from the cell. Such cells rely less on heat dissipation by the structural elements of the cell. Such components can be constructed of a more easily manufactured and processed material.

The inventive biplates are useful in fuel cells, particularly in liquid feed fuel cells. In preferred embodiments, the inventive biplates are useful in liquid feed fuel cells in which a liquid is available to effectively remove heat which builds up from the operation of the cell. Water-containing liquids work well for the purposes of this invention.

Figure 2:
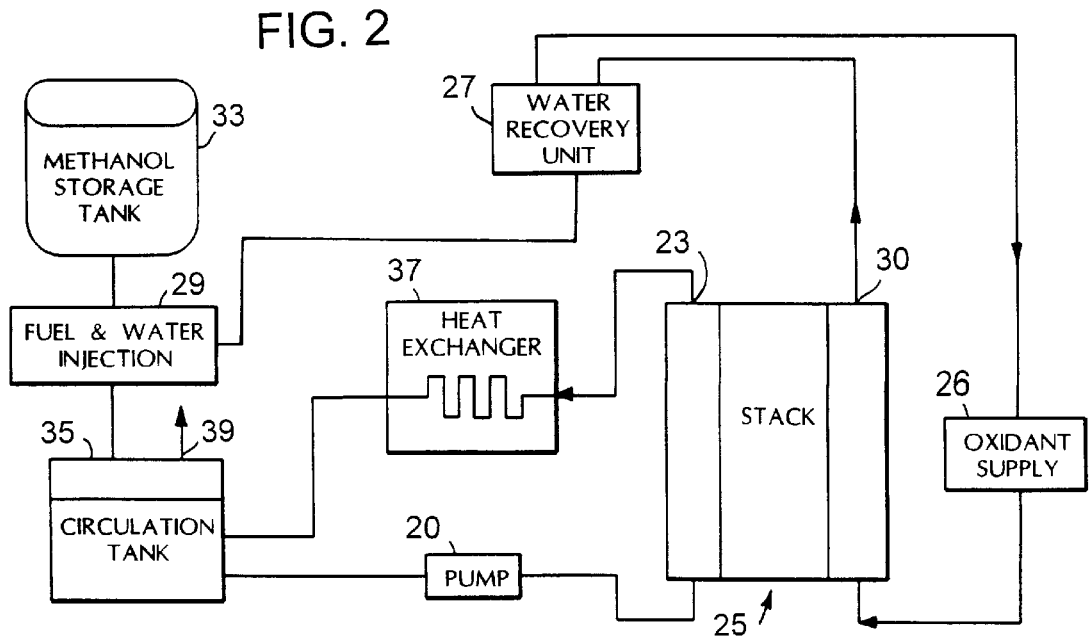
FIG. 2 is a schematic diagram of a particular embodiment of a liquid feed fuel cell system employing a stack of fuel cells.

FIG. 1 illustrates a particular embodiment of liquid feed organic fuel cell 10 having housing 12, anode 14, cathode 16 and solid polymer proton-conducting cation-exchange electrolyte membrane 18. As will be described in more detail below, anode 14, cathode 16 and solid polymer electrolyte membrane 18 are preferably a single multi-layer composite structure, referred to herein as a membrane-electrode assembly (MEA). Pump 20 is provided for pumping an organic fuel and water solution into anode chamber 22 of housing 12. The organic fuel and water mixture is withdrawn through outlet port 23 and is re-circulated through a re-circulation system described below with reference to FIG. 2 which includes methanol tank 19. Carbon dioxide formed in the anode compartment is vented through port 24 within tank 19. Oxygen or air compressor 26 is provided to feed oxygen or air into cathode chamber 28 within housing 12. FIG. 2, described below, illustrates a particular embodiment of a fuel cell system incorporating a stack of individual fuel cells including the re-circulation system. The following detailed description of the fuel cell of FIG. 1 primarily focuses on the structure and function of anode 14, cathode 16 and membrane 18.

Prior to use, anode chamber 22 is filled with the organic fuel and water mixture and cathode chamber 28 is filled with air or oxygen. During operation, the organic fuel is circulated past anode 14 while oxygen or air is pumped into chamber 28 and circulated past cathode 16. When an electrical load (not shown) is connected between anode 14 and cathode 16, electro-oxidation of the organic fuel occurs at anode 14 and electro-reduction of oxygen occurs at cathode 16.

At the anode, a fuel and water mixture flows at a flow rate of from about 10 to about 500 ml/minute, and the following reaction takes place.

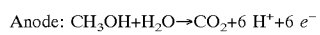

Anode: $CH_3OH + H_2O \rightarrow CO_2 + 6 H^+ + 6 e^-$

Carbon dioxide produced by the above reaction is withdrawn along with the fuel and water solution through outlet 23 and separated from the solution in a gas-liquid separator (described below with reference to FIG. 2). The fuel and water solution is then re-circulated into the cell by pump 20.

Simultaneous with the electrochemical reaction described in the anode equation above, another electrochemical reaction involving the electro-reduction of oxygen, which captures electrons, occurs at cathode 16 and is given by:

Overall, in the cell, the reaction is therefore written as:

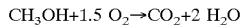

The occurrence of different reactions at the anode and cathode gives rise to a voltage difference between the two electrodes. Electrons generated by electro-oxidation at anode 14 are conducted through the external load (not shown) and are ultimately captured at cathode 16. Hydrogen ions or protons generated at anode 14 are transported directly across membrane electrolyte 18 to cathode 16. Thus, a flow of current is sustained by a flow of ions through the cell and electrons through the external load.

The reaction takes place over a catalyst. The catalyst is located in the fuel cell anode. Catalysts are well known in the art as providing activated surfaces upon which these reactions can take place. Preferred catalysts for the methanol fuel cells of the invention are platinum/ruthenium catalysts. A carbon supported catalyst is preferred because catalyst consumption is thereby minimized, and adhesion to the substrate is increased.

Membrane 18 can be formed from NAFION™ (a copolymer of tetrafluoroethylene, and perfluoropolyether sulfonic acid), modified perfluorinated sulfonic acid polymer, polyhydrocarbon sulfonic acid or composites of two or more kinds of proton exchange membranes.

Anode 14 can be formed from platinum-ruthenium alloy particles either as fine metal powders, that is, "unsupported", or dispersed on high surface area carbon, that is, "supported". Other platinum-based alloys include those made with tin, iridium, osmium or rhenium as the second metal. For platinum-ruthenium, the loading of the alloy particles in the electrocatalyst layer is preferably in the range of 0.5–4.0 $mg/cm^2$.

Cathode 16 is a gas diffusion electrode in which platinum particles are bonded to one side of membrane 18, and is preferably formed from unsupported or supported platinum bonded to a side of membrane 18 opposite to anode 14. Typically available materials and methods of fabrication for the above components are given, for example, in U.S. Pat. No. 5,773,162.

FIG. 2 shows a particular embodiment of a fuel cell system employing a stack of fuel cells similar to the fuel cell shown in FIG. 1. The fuel cell system includes stack 25 of fuel cells, each having the membrane/electrode assembly described above with reference to FIG. 1. Oxygen or air is supplied by oxidant supply 26 which may be, for example, a bottled oxygen supply, an air-blowing fan or an air compressor. An air and water or oxygen and water mixture is withdrawn from stack 25 through outlet port 30 and conveyed to water recovery unit 27, which operates to separate the air or oxygen from the water. A portion of the air or oxygen separated by unit 27 is returned to oxidant supply 26 for re-entry into stack 25. Fresh air or oxygen is added to supply 27. Water separated by unit 27 is fed to fuel and water injection unit 29 which also receives an organic fuel, such as methanol, from storage tank 33. Injection unit 29 combines the water from recovery unit 27 with the organic fuel from tank 33, yielding a fuel and water solution with the fuel dissolved in the water.

The fuel and water solution provided by injection unit 29 is fed into a circulation tank 35. A fuel and water mixture containing carbon dioxide is withdrawn through port 23 from stack 25 and is fed through a heat exchanger 37 and into circulation tank 35. Hence, circulation tank 35 receives both a fuel and water solution from injection unit 29 and a fuel and water solution from heat exchanger 37. Circulation tank 35 extracts carbon dioxide from the fuel and water mixture and releases the carbon dioxide through vent 39. The resulting fuel and water solution is fed through pump 20 and into stack 25. Circulation tank 35 can also be located between stack 25 and heat exchanger 37 so as to remove the carbon dioxide before the heat exchanger and thereby improve the performance of the heat exchanger. Further details are provided, for example, in U.S. Pat. No. 5,599,638, which is incorporated by reference to the extent necessary for proper understanding.

Figure 3:
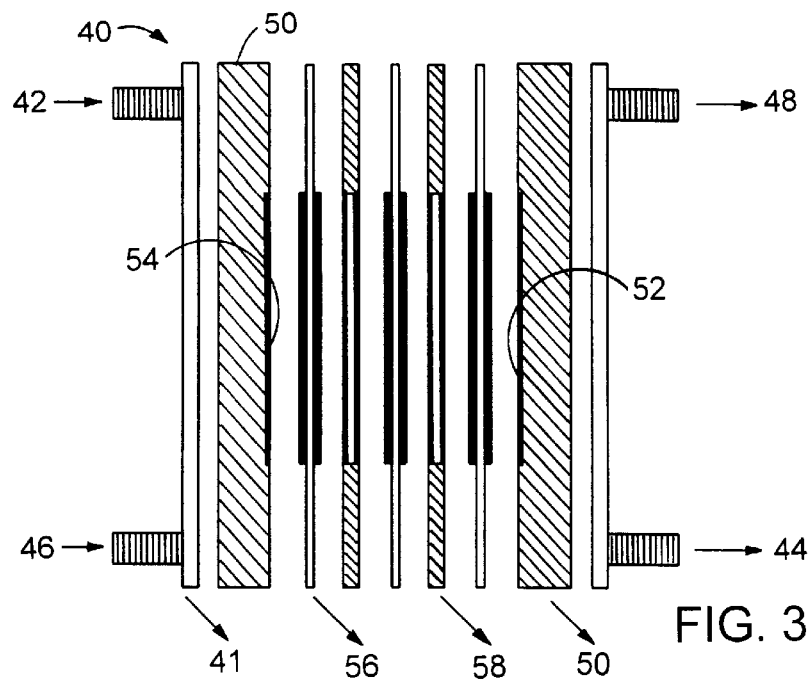
FIG. 3 is an exploded schematic diagram of a particular embodiment of a three cell stack including preferred fuel cell components.

FIG. 3 shows a schematic diagram of a particular embodiment of a stack including three cells. At each end of stack 40 is black plate 41 which has holes adapted to accommodate fuel inlet 42 and fuel outlet 44 and air or oxygen inlet 46 and air or oxygen outlet 48. Immediately abutting back plates 41 are end plates 50 which include the terminal anode 52 and terminal cathode 54 for the stack. Membrane electrode assemblies (MEA) 56 are alternatively inserted with biplates 58 to complete the stack.

Figure 4:
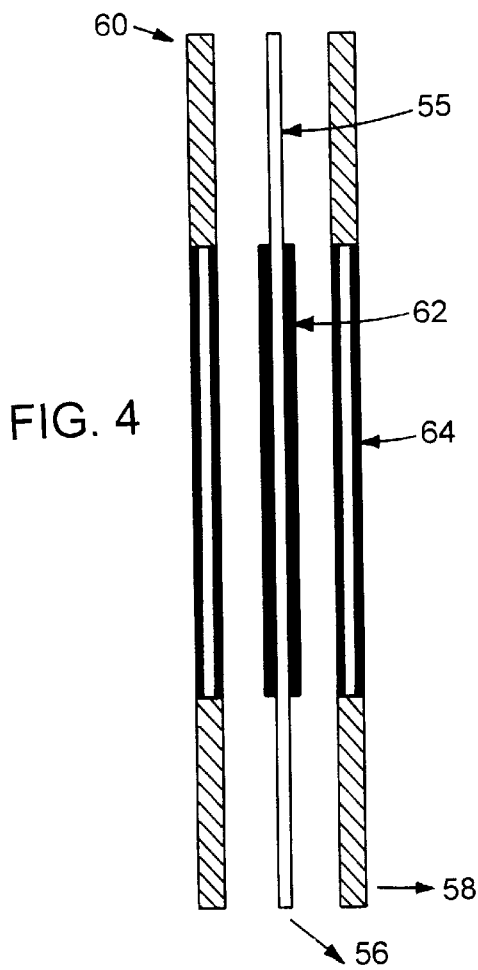
FIG. 4 is an exploded schematic diagram of a particular embodiment of a single stack element.

A single stack element 60 is shown in FIG. 4. As shown, catalyst 62 is distributed on the surfaces of membrane 55, and thus makes up MEA 56. The surfaces of biplates 58 include flowfields 64, to be described further below.

Methanol fuel cells also produce heat, but the heat can be removed by the flowing methanol solution. The methanol solution is from about 92% to about 99% water by weight, so it has the high heat capacity characteristic of water. Because heat need not be removed through structural components of the cell, many of the cell components can be made largely of a non-heat conducting material, such as a polymeric material for example.

Biplate and Endplate

A fuel cell stack includes biplates and endplates. Each are a special kind of plate.

The biplate is a two-sided separator which prevents contact between the negative and positive electrodes of the fuel cell. In many embodiments, the biplate will be substantially planar, with a positive electrode on one side of the plane, and the corresponding negative electrode on the other side of the plane.

The endplate is a special class of biplate that is present at the end of a fuel cell stack, or if a stacked arrangement is not used, it serves as the ends of the cell. Two endplates are generally present in either the stacked or unstacked arrangement. It is also substantially planar in many embodiments, and includes electrically conductive elements. Typically, one endplate will include an anode, and another endplate will include a cathode.

A preferred biplate assembly includes a) a substantially planar biplate, b) a plurality of electrically conductive elements which provide electrical communication from one side of the biplate to the other, c) an air entrance port located at one edge of the biplate, to allow air to enter and remove water which accumulates during operation of the fuel cell, and d) an air exit which is located at another edge of the biplate, to allow air and water to leave the immediate area of the biplate.

According to a particular embodiment, the fuel cell components need not be particularly thermally conductive. Instead, the heat conductivity of the fuel, which can be typically at least 90% water, is used. Thus the high heat capacity of water is available to absorb heat and carry it away as it flows through the cell and to a heat sink which can be conveniently provided outside the cell. Preferably, the fuels are from about 92% to about 99% water, with the remainder comprising methanol. Fuel mixtures preferred for use in the methanol fuel cells of the invention are about 97% water and about 3% methanol.

The plates preferably have a density which is low relative to the density of typical prior art fuel cell components. Since the typical prior art components are made of graphite or other electrically conductive material, replacement of a fuel cell biplate or endplate made of metal or graphite by plates made of a polymeric or other easily manufactured material results in a lower weight fuel cell. The density of an electrically conductive material such as the most commonly used conductive material for biplates and endplates, graphite, is about 2 grams/cm$^3$. Desirably, the density of the biplates and endplates of the invention is less than 2 g/cm$^3$, more desirably less than about 1.5 g/cm$^3$. This results in a significant savings in weight.

The fuel cell components still retain the requirement that they maintain structural integrity at temperatures of up to about 90° C. and not be corroded by methanol. This is not a particularly difficult requirement for many polymeric materials, such as thermoplastic materials, including both amorphous and crystalline thermoplastics. Some useful thermoplastic materials include poly olefins such as high density polyethylene, and polypropylene; polyamide plastics; polycarbonates; polyesters including polyethylene terephthalate), and poly(butylene terephthalate; polyethers; phenolic resins; and polystyrenes including acrylonitrile-butadiene-styrene (ABS). Copolymers of the above materials can also be utilized in the invention.

If the need for further structural strength arises, the thermoplastic materials can be reinforced with fibers such as carbon or Kevlar (E. I. du Pont de Nemours & Co., Inc.) without a significant increase in density. Carbon fibers and Kevlar have specific gravities which can be as low as 1.6 and 1.4, respectively.

Also, the materials to be used are generally less expensive than the electrically conductive materials which are typically required to be chosen. Such materials can also be more easily processable. For example, the fuel cell components can be molded around the electrically conductive elements of the invention to form a seal. Thus, the manufacture of biplates and endplates according to the invention is cheaper and more versatile than it would be for biplates made of known electrically conductive materials.

The fuel cell biplates and endplates according to the invention can be made of mineral-filled phenolic plastic (Bakelite). The density of Bakelite is about 1.3 g/cm$^3$. Such a biplate or endplate can be molded around the electrically conductive elements (discussed below). Alternatively, the electrically conductive elements can be friction fit into holes in the fuel cell components which are present in the molded article, or are created after molding is completed. In another embodiment, the electrically conductive elements are forced through the biplate.

The fuel cell components of the invention can be manufactured by extrusion, injection molding, blow molding, and compression molding.

The inventive fuel cell components also include at least one air or oxygen entrance port located near an edge of the biplate, to allow air to enter and remove water which accumulates during operation of the fuel cell. The fuel cell components also include at least one air or oxygen exit port which is located near an edge of the biplate or endplate, to allow air (or oxygen) and water to leave the immediate area of the electrodes. In preferred embodiments, the air entrance and exit ports are located at opposite edges of the biplate or endplate. The inventive fuel cell components also include at least one liquid fuel entrance port located near an edge of the biplate or endplate, and at least one liquid fuel exit port located near an edge of the biplate or endplate. In preferred embodiments, the liquid entrance and exit ports are located at opposite edges of the plates. The air or oxygen ports and the liquid fuel ports can be located near opposite edges of the plate, although this is a typical embodiment.

Electrically Conductive Elements

The biplates and endplates of the present invention need not be entirely electrically conductive. Only those points which are actually in contact with the fuel cell electrodes are required to be electrically conductive. The biplates of the present invention necessarily include electrically conductive elements which allow electrical communication between the media on each side of the biplate. The endplates of the present invention necessarily include electrically conductive elements which allow electrical communication between the medium on one side of the endplate and an electrical load which is applied. This connection can be made through the back of an endplate, or through a side of the endplate.

Figure 5:
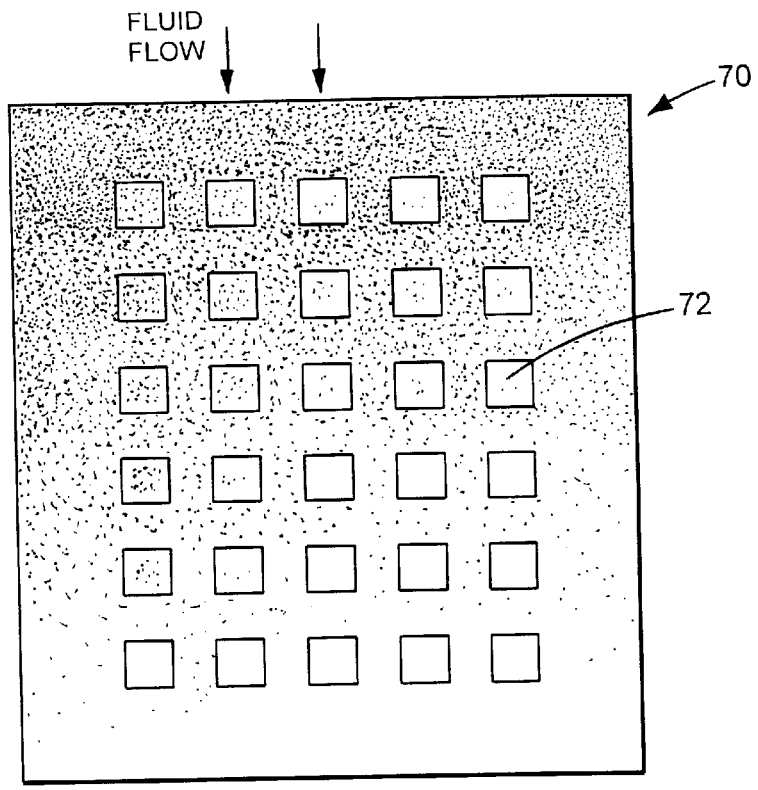
FIG. 5 is a face-on view of a schematic diagram of a particular embodiment of a plate of the invention showing a pincushion flowfield.
Figure 6:
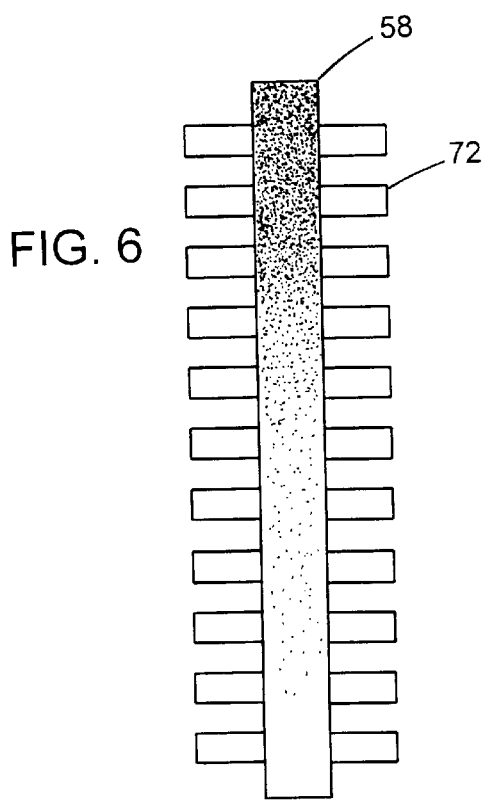
FIG. 6 is a side-view of a schematic diagram of a particular embodiment of a biplate.

Electrical current must pass from one side of a biplate to the other side. The electrically conductive elements pass through the biplate and extend into the media on each side of the plate. As noted above, the biplate itself does not need to be electrically conductive. The electrically conductive elements can be arranged in any suitable pattern throughout the biplate. In some preferred embodiments, a plurality of such electrically conductive elements define what is referred to as a "pincushion" pattern of electrically conductive elements. FIG. 5 shows a plate 70, which can be a biplate or endplate, having a particular embodiment of the pincushion flowfield pattern made up of electrically conductive elements 72. The direction of fluid flow is indicated. The "pincushion" can extend to both sides of the biplate. FIG. 6 is a side view of biplate 58, with a particular embodiment of a pincushion flowfield established on each side of the biplate, and made up of electrically conductive elements 72. The electrically conductive elements as pins or rods can extend directly through the biplate, or they can have electrical communication with an intermediate electrically conductive element, for example a plate located in the biplate. This pattern defines a flowfield, which is a collection of channels which allow fuel or air to disperse over the electrode. The pattern is not limited to that shown in FIG. 5 or 6, but can take on a variety of patterns, regular and nonregular.

An endplate will typically have a flowfield on one of its surfaces, preferably the surface forming a wall of one of the fuel cell compartments. The electrically conductive elements forming this flowfield will provide electrical communication with at least one, but preferably not more than about 5, electrical terminals. These terminals can be electrically connected to a load. Thus, in a stack, or an unstacked arrangement, electrical communication between anodic and cathodic endplates is made through an electrical load. This load is typically used for transportation, heating, or any other useful purpose.

The advantage of a pincushion flowfield over other types of flow field, such as a serpentine flowfield is that the contact points of a pincushion are geometrically simple. As compared to machining contact points out of a single block of material, the separate manufacture of pins and biplates or endplates is easy.

Optionally but desirably, the particular flowfield pattern employed allows the flow of fuel or air with as little resistance as possible, while still allowing diffusion of fuel or air to the electrically conductive elements. This type of flowfield has been found to work well with methanol fuel cells. The walls of these channels serve as electrical contacts.

The pincushion field is present on both sides of the biplate. This can be accomplished by having a single pin pass through the biplate and serve as the contact point for both the anode and cathode. Thus, the pins can be made completely separately from the biplate. The pins are not required to be the same on each side of the biplate. For example, certain embodiments can be constructed so that the pins are longer on one side of the biplate than they are on the other side. Alternatively, the shape of the pins need not be the same on each side of the biplate. Useful pins can be of any conveniently prepared dimension, but good impedences (no more than about 2% of the impedance of the MEA) are obtained with pins of diameters from about 1/16" to about 1/4". The pins can extend from about 0.2 mm to about 5 mm from the surface of the plates. The pins can be spaced anywhere from about 0.22 mm to about 5 mm apart.

For endplates, the electrically conductive elements may or may not pass completely through the component. If the electrically conductive elements do pass completely through the endplate, it may be desirable to electrically join all the electrically conductive elements to allow a minimum number of terminals for connection to the load. This can be done by providing an electrically conductive plate, for example, which is in contact with the electrically conductive elements on the side of the endplate which is opposite a particular fuel cell compartment. This electrically conductive plate could be overlaid with an electrically non-conductive plate of substantially the same size, to allow electrical insulation between the endplate and backplate. Alternatively, the backplate could be assembled adjacent to such an electrically conductive plate, as long as the backplate is made of an electrically non-conductive material.

The electically conductive elements of the invention are generally made of metal or graphite or other conductive materials. A long square or rectangular rod of an electrically conductive material (metal or graphite, for example) can be formed and chopped into many "pins". Alternatively, round "pins" can be made out of a cylindrical rod.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A liquid feed fuel cell system comprising:
  a) a plate assembly comprising:
    1) at least two substantially planar plates fabricated from a polymeric material, each plate having at least one surface that presses against a membrane electrode assembly of the liquid fuel cell; and
    2) a plurality of electrically conductive elements extending outwardly, away from at least one surface of the plates, providing electrical communication through the plates;
  b) an oxidant supply, which supplies an oxidant to at least one surface of at least one plate;
  c) a liquid fuel supply, which supplies liquid fuel to at least one surface of at least one plate; and
  d) an electrical load which is in electrical contact with the electrically conductive elements of at least two of the plates.

2. The system of claim 1, wherein the polymeric material is selected from amorphous and crystalline thermoplastic materials.

3. The system of claim 2, wherein the polymeric material is selected from poly olefins, polyamide plastics, polycarbonates, polyesters, polyethers, phenolic resins, and polystyrenes, and copolymers thereof.

4. The system of claim 1, wherein the plate has a density of less than 2.0 grams/cm$^2$.

5. The system of claim 4, wherein the plate has a density of less than about 1.4 grams/cm$^2$.

6. The system of claim 1, wherein the electrically conductive elements are arranged in a pincushion array.

7. The system of claim 6, wherein the electrically conductive elements are rectangular in cross-section.

8. The system of claim 1, wherein the electrically conductive elements comprise graphite.

9. The system of claim 1, wherein at least one plate is a biplate, and the electrically conductive elements extend outwardly, away from both surfaces of the biplate.

10. The system of claim 9, wherein the electrically conductive elements pass completely through the biplate.

11. The system of claim 1, wherein the electrically conductive elements are rods.

12. The system of claim 11, wherein the electrically conductive elements are rectangular in cross-section.

13. The system of claim 1, wherein at least two plates are endplates.

14. A method of generating power with a liquid feed fuel cell system assembly, comprising:
  a) obtaining at least one substantially planar plate fabricated from a polymeric material and a plurality of electrically conductive elements extending outwardly, away from at least one side of the plate, providing electrical communication through the plate; and
  b) operating the fuel cell in a way that uses the liquid fuel, not the planar plates to conduct heat.

15. The method of claim 14, wherein the polymeric material polyolefins, polyamide plastics, polycarbonates, polyesters, polyethers, phenolic resins, and polystyrenes, and copolymers thereof.

16. The method of claim 14, wherein the plate has a density of less than about 1.4 grams/cm$^2$.

17. The method of claim 14, wherein the electrically conductive elements are arranged in a pincushion array.

18. The method of claim 14, wherein the electrically conductive elements are rectangular in cross-section.

19. The method of claim 14, wherein at least one plate is a biplate, and the electrically conductive elements extend outwardly, away from both surfaces of the biplate.

20. The method of claim 14, wherein the electrically conductive elements pass completely through the biplate.

* * * * *